Patented May 28, 1946

2,400,913

UNITED STATES PATENT OFFICE 2,400,913

NEW COMPOSITION OF MATTER

Alfred Burger, Charlottesville, Va., assignor to Smith, Kline & French Laboratories, Philadelphia, Pa., a corporation of Pennsylvania No Drawing. Application February 26, 1944,
Serial No. 524,073

5 Claims. (Cl. 260—333)

This invention relates to a new composition of matter and, more particularly, to certain heterocyclic tertiary-amino alcohol compounds.

The new compounds contemplated and comprised within the scope of this invention will be made broadly apparent by the following structural formula:

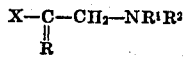

in which:

X is a radical from the group of heterocyclic rings consisting of furan, tetrahydrofuran, tetrahydropyran, tetrahydrothiopyran and tetrahydrothiophene;

$NR^1R^2$ is a tertiary amino radical, and

=R is a member of the group consisting of =O,

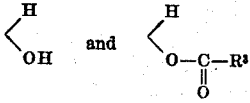

where $R^3$ is a radical from the group consisting of alkyl, aryl and aralkyl.

According to this invention the organic and inorganic salts and the optical isomers of the compounds embraced within the above formula are contemplated and included within the scope of this invention.

The novel compounds according to this invention are variously useful. Thus, for example, they are generally useful as chemical intermediates and variously have been found to possess capacity for producing physiological effects.

Typical compounds within the scope of this invention and which will serve to exemplify the compounds contemplated by this invention variously, from the broad and specific standpoints, are as follows:

I. Oxygen ring compounds.
   (a) Intermediate ketones.

(1) X— is the furan ring 2-(1-oxo-2-piperidinoethyl) furan
      B. P. (4 mm. Hg) 139–140° C.
      M. P. HCl salt 264–266° C. with decomposition
   2-(1-oxo-2-morpholinoethyl) furan
      M. P. HCl salt 221–229° C. with decomposition
   2-[1-oxo-2-(4-methylpiperidino)-ethyl] furan
      B. P. (4 mm. Hg) 133–139° C.
      M. P. HCl salt 253–265° C.
   2-(-oxo-2-diethylamino ethyl) furan
      B. P. (4 mm. Hg) 100–104° C.

(2) X— is the tetrahydropyran ring 4-diethylaminoacetyl tetrahydropyran hydrochloride
      M. P. 152–155° C.
   4-piperidinoacetyl tetrahydropyran hydrochloride
      M. P. 177–179° C.
   4-morpholinoacetyl tetrahydropyran hydrochloride
      M. P. 214–219° C.
   4-(4-methylpiperidino) acetyl tetrahydropyran hydrochloride
      M. P. 211–213° C.

(b) Unsaturated amino alcohols.

(1) X— is the furan ring 2-(1-hydroxy-2-piperidinoethyl) furan
      B. P. (5 mm. Hg) 127–128° C.
      M. P. HCl salt 172–174° C.
   2-(1-hydroxy-2-morpholinoethyl) furan
      B. P. (5 mm. Hg) 146–150° C.
      M. P. HCl salt 185–186° C. with decomposition
   2-[1-hydroxy-2-(4-methylpiperidino)-ethyl] furan
      B. P. (4 mm. Hg) 126–128° C.
      M. P. 70–72° C.
   2-(1-hydroxy-2-ethylpropylaminoethyl) furan (c) Saturated amino alcohols.

(1) X— is the tetrahydrofuran ring 2-(1-hydroxy-2-piperidinoethyl)-tetrahydrofuran
      B. P. (4 mm. Hg) 125–126° C.
      M. P. HCl salt 170–173° C.
   2-(1-hydroxy-2-morpholinoethyl)-tetrahydrofuran
      B. P. (12 mm. Hg) 138–140° C.
      M. P. HCl salt 170–176° C. (hygroscopic)
   2-[1-hydroxy-2-(4-methylpiperidino)-ethyl] tetrahydrofuran
      B. P. (4 mm. Hg) 131–132° C.
   2-(1-hydroxy-2-dipropylaminoethyl) tetrahydrofuran (2) X— is the tetrahydropyran ring 4-(1-hydroxy-2-diethylamino ethyl) tetrahydropyran
      M. P. HCl salt 140.5–142° C.
   4-(1-hydroxy-2-piperidino ethyl) tetrahydropyran
      M. P. HCl salt 208–210° C.

4-(1-hydroxy-2-morpholino ethyl) tetrahydropyran
  M. P. HCl salt 213–216° C.
4-[1-hydroxy-2-(4-methylpiperidino)ethyl] tetrahydropyran
  M. P. HCl salt 224–227° C.
4-[1 - hydroxy - 2 - di(hydroxyethyl) amino ethyl] tetrahydropyran
4-(1-hydroxy-2-dibenzylamino ethyl) tetrahydropyran (d) Ester derivatives.

(1) X— is the furan ring 2-(1-acetoxy-2-morpholino ethyl) furan
  M. P. HCl salt 166–167° C. with decomposition
2-[1-acetoxy-2-(4 - methylpiperidino)ethyl] furan
  M. P. HCl salt 179–181° C. with decomposition (2) X— is the tetrahydrofuran ring 2-(1-acetoxy - 2 - piperidino ethyl)-tetrahydrofuran
  M. P. HCl salt 191–194° C.
2-(1-propionyloxy - 2 - dibutylamino ethyl) tetrahydrofuran (3) X— is the tetrahydropyran ring 4-(1-acetoxy-2-piperidino ethyl) tetrahydropyran
  M. P. HCl salt 211–213° C.
4-(1-acetoxy-2-morpholino ethyl) tetrahydropyran
  M. P. HCl salt 223–225° C.
4-[1-acetoxy-2-(4-methylpiperidino)-ethyl] tetrahydropyran
  M. P. HCl salt 178–181° C.
4-(1-benzoyloxy-2-piperidino ethyl) tetrahydropyran
  M. P. HCl salt 198–199° C.
4-[1-acetoxy-2-di(β-phenylethyl(aminoethyl] tetrahydropyran
4-(1-benzoyloxy-2-ethylbenzylamino ethyl) tetrahydropyran II. Sulfur ring compounds.
 (a) Intermediate ketones.

(1) X— is the tetrahydrothiopyran ring 4-diethylaminoacetyl tetrahydrothiopyran
4-piperidinoacetyl tetrahydrothiopyran
4-morpholinoacetyl tetrahydrothiopyran
4-(4-methylpiperidino) acetyl tetrahydrothiopyran
4-di-n-hexylaminoacetyl tetrahydrothiopyran (b) Saturated amino alcohols.

(1) X— is the tetrahydrothiophene ring 2-(1-hydroxy-2 - piperidinoethyl) - tetrahydrothiophene
2-(1-hydroxy-2-morpholinoethyl)-tetrahydrothiophene
2-[1-hydroxy-2-(4 - methylpiperidino) ethyl]-tetrahydrothiophene
2-(1-hydroxy-2-propylbenzylamino ethyl)-tetrahydrothiophene (2) X— is the tetrahydrothiopyran ring 4 - (1-hydroxy-2-diethylaminoethyl) tetrahydrothiopyran
4-(1-hydroxy - 2 - piperidinoethyl) tetrahydrothiopyran
4-(1-hydroxy-2-morpholinoethyl) tetrahydrothiopyran
4-[1-hydroxy-2-(4-methylpiperidino) - ethyl] tetrahydrothiopyran
4 - (1-hydroxy-2-dibutylaminoethyl) tetrahydrothiopyran (c) Ester derivatives.

(1) X— is the tetrahydrothiophene ring 2-(1-acetoxy-2-piperidino ethyl) tetrahydrothiophene
2-(1-acetoxy - 2 - morpolino ethyl) tetrahydrothiophene
2-(1-acetoxy-2-diethylamino ethyl) tetrahydrothiophene
2-(1-benzoyloxy-2-piperidino ethyl) tetrahydrothiophene
2-(1-acetoxy-2-dibenzylamino ethyl) tetrahydrothiophene (2) X— is the tetrahydrothiopyran ring 4-(1-acetoxy-2-piperidino ethyl) tetrahydrothiopyran
4-(1-acetoxy-2-morpholino ethyl) tetrahydrothiopyran
4-[1-acetoxy-2-(4-methyl piperidino)ethyl] tetrahydrothiopyran
4 - (1-benzoyloxy-2-piperidinoethyl) tetrahydrothiopyran
4-(1-acetoxy-2-dipropylaminoethyl) tetrahydrothiopyran
4-[1 - acetoxy - 2 - di(hydroxyethyl) amino ethyl] tetrahydrothiopyran Generally speaking, the new compounds contemplated by and according to this invention may be produced by reacting acyl halide derivatives of furan, tetrahydrothiophene, tetrahydropyran or tetrahydrothiopyran, depending upon the compounds to be produced, with a diazo alkane to yield the corresponding diazo ketones. These compounds are treated with hydrogen halides to produce alpha-halogeno ketones. The halogeno ketones are then reacted with secondary amines yielding the corresponding alpha-tertiary-amino ketones, which in turn are reduced to the corresponding alpha-tertiary-amino alcohols. The reduction may be carried out with catalytically activated hydrogen. In the case of compounds of the furan series, the reduction will be more advantageously carried out with an oxidizable metal alkoxide, such as, for example, aluminum isopropoxide, magnesium ethoxide, or the like.

The furan amino alcohols may be hydrogenated catalytically to tetrahydrofuran amino alcohols. The procedure for producing the furan ring compounds differs slightly from that for producing the tetrahydropyran, tetrahydrothiopyran and tetrahydrothiophene compounds. However, the difference in detail of procedure for making the various compounds by way of example will appear from the disclosure hereinafter.

As illustrative of procedure for the preparation of compounds in accordance with this invention the following detailed description for procedure for preparation of various specific compounds will, it is believed, make clear the procedure for the preparation of the various other compounds contemplated by and included within this invention:

*Furan compounds*

For the preparation of 2-chloroacetylfuran, a solution of 101 g. of furoyl chloride in 100 cc. of absolute ether is dropped into an ice cold ether solution of 65 g. of diazomethane; vigorous evolution of nitrogen occurs. After all the acid chloride has been added, the solution is allowed to warm to room temperature and to stand over night. Most of the ether is removed by distillation and finally by an air jet, leaving a bright yellow oil which crystallizes at low temperature. It melts below room temperature, and the crude diazo ketone is therefore converted to the chloroketone without further purification.

The concentrated ether solution of 2-diazoacetylfuran is cooled in an ice bath, stirred vigorously, and treated with concentrated hydrochloric acid until acid with Congo red. A cold, concentrated solution of potassium carbonate is added to neutralize the excess acid, the oily chloroketone extracted into ether and dried over sodium sulfate. After evaporation of the solvent the chloroketone is distilled rapidly. The yield of the fraction boiling at 93–108° (4 mm.) is 99.1 g. (88% based on furoyl chloride, 65.5% based on crude 2-furoic acid). Pure 2-chloroacetylfuran crystallizes at 0° C.

For the preparation of 2-(1-oxo-2-piperidinoethyl)-furan, an ice cold solution of one-half mole of piperidine in 100 cc. of ether is treated slowly with a solution of 0.2 mole of 2-chloroacetylfuran in 100 cc. of ether. The amine hydrochloride separates rapidly, and the mixture is kept at 0° C. for one hour, allowed to warm to room temperature and to stand over night. It is washed with water, the ether solution dried over sodium sulfate, the solvent distilled on the water bath, and any unreacted secondary amine removed by heating at 18 mm. and 100°. [The amino ketones are usually sparingly soluble in water, except 2 - (1 - oxo - 2 - morpholinoethyl) - furan.] The amino ketone is purified by distillation under 4 mm. pressure, and for further purification converted to the hydrochloride with dry hydrogen chloride in acetone-ether solution. M. P. of 2-(1-oxo-2-piperidinoethyl)-furan hydrochloride, 264–266° C.

For the preparation of 2-(1-hydroxy-2-piperidinoethyl)-furan, in a 200 cc. round bottomed flask equipped with a 1 m. fractionating column filled with glass helices is placed 10–12 g. of the amino ketone hydrochloride and a 200% excess of a 3 N. aluminum isopropoxide solution, and c. p. isopropyl alcohol is added to make a total volume of about 140 cc. After the mixture has refluxed gently for sixty to ninety minutes and much of the amino ketone hydrochloride has dissolved, the rate of boiling is increased to permit the acetone to distill. When the 2,4-dinitrophenylhydrazine test for acetone becomes negative, gentle refluxing is resumed for another ninety minutes. Some acetone distills again. The reduction is complete at this point as shown by the fact that no more acetone is produced when the mixture is boiled for another hour. Most of the isopropyl alcohol is removed under 100 mm. pressure, the viscous residue digested with an excess of 10 N. sodium hydroxide solution with stirring until all the aluminum salts have gone into solution, the mixture is extracted with ether, and the extract dried over sodium sulfate. The ether is distilled on a steam bath, and the 2-(1-hydroxy - 2- piperidinoethyl) -furan purified by distillation. The hydrochloride is prepared in acetone solution, M. P. 172–174° C.

Variously the above reduction of the furan amino alcohols may be carried out with other oxidizable metal alkoxides, such as magnesium, ethoxide in ethanol, and the like agents.

For the preparation of 2-(1-hydroxy-2-piperidinoethyl)-tetrahydrofuran, the 2-(1-hydroxy-2-piperidinoethyl)-furan absorbs usually 2.3–2.4 moles of hydrogen in ethanol solution in the presence of Raney nickel in the course of ten to twelve hours. The catalyst is filtered off, the solvent evaporated under reduced pressure, the base is liberated with alkali and extracted with ether. The amino alcohol is purified by fractional distillation. It appears as a colorless oil, B. P. (4 mm.) 125–126° C. The hydrochloride salt melts at 170–173° C.

For the preparation of 2-(1-acetoxy-2-piperidinoethyl)-furan and tetrahydrofuran, acetylation of the furyl and tetrahydrofuryl amino alcohols is carried out by heating the free bases with an excess of acetic anhydride at 100° C. for one hour. The hydrochlorides usually crystallize when ethereal hydrogen chloride is added to the reaction mixture. M. P. of 2-(1-acetoxy-2-piperidino-ethyl)-tetrahydrofuran hydrochloride, 191–194° C.

*Tetrahydropyran compounds*

For the preparation of tetrahydropyran-4-carboxylic acid, to a solution of 46 g. of sodium in 500 cc. of absolute ethanol, placed in a three-neck flask fitted with a reflux condenser, a stirrer, and a dropping funnel, 304 cc. of diethyl malonate is added, and the mixture stirred for 5 minutes. Dichlorodiethyl ether (238.5 cc.), purified by distillation of the commercial product, is added, and the mixture is refluxed with stirring over-night. After cooling, another 46 g. of sodium dissolved in 500 cc. of absolute ethanol is added, and refluxing continued for 48 hours. The precipitated sodium chloride is filtered, the alcohol driven off on a steam bath, the residue treated with water and extracted with three 200 cc. portions of ether. After drying over sodium sulfate, the ether is evaporated, and the diethyl tetrahydropyran - 4,4 - dicarboxylate distilled. The yield of the fraction of B. P. (23 mm.) 140–170° is approximately 272 g.

The ester is hydrolyzed by boiling with a solution of 202 g. of potassium hydroxide in 440 cc. of water and 1900 cc. of ethanol for 15 hours. The alcohol is distilled off, and water is added to increase the total volume to 1400 cc. The clear solution is acidified with concentrated hydrochloric acid. Although a small portion of the dicarboxylic acid precipitates, the major portion is obtained only after 3 days of continuous extraction with ether. The ether extract is dried over sodium sulfate, the solvent evaporated, and the solid residue decarboxylated without further purification.

Thirty gram portions of tetrahydropyran-4,4-dicarboxylic acid are heated in a sausage flask at 175–185° for about twenty minutes until the evolution of carbon dioxide ceases, and the tetrahydropyran-4-carboxylic acid is purified by distillation. The yield of the acid boiling at 18 mm. and 145–150° is approximately 136 g.

For the preparation of 4-tetrahydropyranoyl chloride, a mixture of 153 g. of tetrahydropyran-4-carboxylic acid and 240 cc. of thionyl chloride is refluxed for two hours, and fractionated under reduced pressure. The acid chloride boils at 93–95° C. under 21 mm. pressure; the yield is approximately 143 g.

For the preparation of 4-diazoacetyltetrahydropyran, a solution of 27 g. of 4-tetrahydropyranoyl chloride in 30 cc. of dry ether is dropped slowly into an ice cold solution of 16 g. of diazomethane in 1500 cc. of ether which has been dried over solid potassium hydroxide. Nitrogen is evolved vigorously, and the solution is allowed to warm to room temperature. After one hour it is concentrated to 300 cc. and used directly in the preparation of the bromoketone. The diazoketone crystallizes on cooling of its concentrated solution in ether, and is recrystallized from ether-petroleum ether. The yellow needles melt at 42–45° C. (dec).

For the preparation of 4-bromoacetyltetrahydropyran, the ether solution of the crude diazoketone is cooled in an ice bath, and treated slowly with a solution of 55 cc. of 48% aqueous hydrobromic acid in 55 cc. of ether. After completion of the addition the solution is allowed to stand for 30 minutes, and then solid sodium carbonate is added until the mixture reacts alkaline. This is necessary because the bromoketone is readily soluble in dilute aqueous hydrobromic acid. The ether layer is separated, the solution extracted three times with ether, the combined extracts are dried over sodium sulfate, and the solvent is removed by distillation. The oily residue weighs about 40 g. and is used directly in the reaction with secondary amines. Pure 4-bromoacetyltetrahydropyran crystallizes on cooling of the crude oily product, and is purified by sublimation at 50° and 1 mm. pressure. The colorless needles melt at 50–53° C. The compound acts as a strong lachrymator.

For the preparation of 4-piperidinoacetyltetrahydropyran, a solution of 0.1 mole of the crude oily bromoketone in 150 cc. of dry ether is allowed to stand with 0.25 mole of piperidine for five hours; the hydrobromide of the amine precipitates from the solution. The mixture is washed with water, the ether layer dried over sodium sulfate, and solvent evaporated, and the oily residue heated at 95° C. and 20 mm. pressure for one hour in order to remove any unreacted piperidine. The base is dissolved in acetone and neutralized with ethereal hydrogen chloride. The hydrochloride may be recrystallized from ethanol or acetone and ether. When making the corresponding morpholinoketone by this procedure, in order to isolate the morpholinoketone, the reaction mixture should be made alkaline and extracted exhaustively with ether.

For the preparation of 4-(1-hydroxy-2-piperidinoethyl) tetrahydropyran, a 15% alcoholic solution of 4-piperidinoacetyl tetrahydropyran hydrochloride is hydrogenated in the presence of platinum oxide under one atmosphere pressure. Absorption of hydrogen is complete after about six hours. The catalyst is filtered, the solvent removed under reduced pressure, and the crystalline hydrochloride recrystallized from alcohol and acetone. The salt appears as a colorless powder and is readily soluble in water.

For the preparation of 4-(1-acetoxy-2-piperidinoethyl)-tetrahydropyran, the hydrochloride of 4-(1-hydroxy-2-piperidinoethyl)-tetrahydropyran is warmed with an excess of acetic anhydride in pyridine at 60° for 8 hours. The solvents are distilled under reduced pressure, the residues treated with sodium carbonate solution, the oily esters extracted into ether and converted to the hydrochlorides.

The above examples of procedure for the manufacture of various oxygen ring compounds is applicable to the preparation of the sulfur ring compounds included within this invention. Thus, tetrahydrothiophene derivatives may be made in the manner described above with reference to the production of tetrahydropyran compounds, using as starting material tetrahydrothiophene-2-carbonyl chloride. For the preparation of tetrahydrothiopyran compounds the procedure described above for tetrahydropyran compounds may be used, using dichlorodiethyl thioether as the starting material.

In the above illustrations of procedure for the production of the various compounds contemplated by this invention, the preparation of specifically tertiary piperidino compounds is described. It, however, will be appreciated that the procedures described are directly applicable for the production of other tertiary amine compounds using as reagents secondary amines such as di-alkyl, diaralkyl, alkylaralkyl, arylalkyl, di-(hydroxyalkyl), di-(alkoxyalkyl) amines, and the like, for example, dimethylamine, diethylamine, dipropylamine, dibenzylamine, ethylphenylamine, propylbenzylamine, diethanolamine, dibutanolamine, and the like; heterocyclic amines such as morpholine, tetrahydroisoquinoline, and substituted heterocyclic rings such as 2-, 3-, and 4-alkylpiperidines.

It will, of course, be apparent to those skilled in the art that following the procedure outlined above for the production of esters of a specific compound will result in the production of various esters dependent only upon the acid radicals used. Again, esters of the various compounds may be produced by using various acid radicals by other procedures known in the art.

Benzoyl derivatives, for example, of the various amino alcohols may be prepared by shaking 1 gram of the amino alcohol and 1 gram of benzoyl chloride with 10 cc. of 10% sodium hydroxide solution for 30 minutes. The oil is extracted into ether, the ether solution washed with water, dried over anhydrous sodium sulfate, and concentrated on the steam bath. The oily derivative may be converted to the hydrochloride salt by neutralization with dry hydrogen chloride in acetone solution, and the salt crystallized from alcohol-ether.

It will be apparent to those skilled in the art that salts other than the hydrochlorides of these compounds may be prepared, for example, by dissolving the free base in a suitable organic solvent, such, for example, as alcohol, acetone, dioxane, etc., and adding the necessary amount of organic or inorganic acid, such, for example, as hydrobromic, tartaric, sulfuric, oxalic, etc. in a like solvent. The salts will precipitate either spontaneously or with the use of ether.

It will be appreciated that in accordance with this invention optical isomers of the furan, tetrahydrofuran, tetrahydrothiophene, tetrahydropyran and tetrahydrothiopyran amino alcohols and esters are contemplated as within the invention. The optical isomers of these several compounds may, for example, be separated from the racemic compounds by fractional crystallization, for example, of their salts of optically active acids, such as d-tartaric acid, d- or l-citric acid, mandelic acid, d-camphor-sulfonic acid, and the like, following well known procedure.

What I claim and desire to protect by Letters Patent is:

1. A chemical compound having the formula

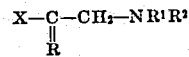

in which: X is a radical from the group of heterocyclic rings consisting of furan, tetrahydrofuran, tetrahydropyran, tetrahydrothiopyran and tetrahydrothiophene directly linked through a ring carbon atom; $NR^1R^2$ is a tertiary amino radical, and =R is a member of the group consisting of =O,

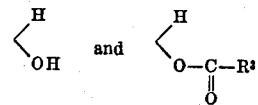

where $R^3$ is a radical from the group consisting of alkyl, aryl and aralkyl, and salts and optical isomers thereof.

2. A chemical compound according to claim 1, characterized by the fact that X is a tetrahydropyran radical.

3. A chemical compound according to claim 1, characterized by the fact that R is oxygen.

4. A chemical compound according to claim 1, characterized by the fact that R is

5. A chemical compound according to claim 1, characterized by the fact that $NR^1R^2$ is a heterocyclic ring.

ALFRED BURGER.